United States Patent
Nishio et al.

(10) Patent No.: US 12,367,851 B2
(45) Date of Patent: *Jul. 22, 2025

(54) INFORMATION PROCESSING APPARATUS AND CONTROL METHOD

(71) Applicant: Lenovo (Singapore) Pte. Ltd., Singapore (SG)

(72) Inventors: Masashi Nishio, Kanagawa (JP); Yuji Wada, Kanagawa (JP); Mamoru Okada, Kanagawa (JP); Eri Shimizu, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,276

(22) Filed: Feb. 22, 2024

(65) Prior Publication Data

US 2024/0321236 A1    Sep. 26, 2024

(30) Foreign Application Priority Data

Mar. 24, 2023    (JP) ................................. 2023-047905

(51) Int. Cl.
  *G06F 3/042* (2006.01)
  *G06T 7/70* (2017.01)
  *G06V 10/60* (2022.01)
  *G06V 40/16* (2022.01)
  *G09G 5/10* (2006.01)

(52) U.S. Cl.
  CPC ................ *G09G 5/10* (2013.01); *G06T 7/70* (2017.01); *G06V 10/60* (2022.01); *G06V 40/161* (2022.01); *G06T 2207/30201* (2013.01); *G09G 2320/0626* (2013.01)

(58) Field of Classification Search
  CPC ....... G09G 2320/0626; G09G 2320/06; G09G 2330/021; G09G 2330/022; G09G 2330/023; G09G 2330/027; G09G 5/10; G06T 7/70; G06F 3/0425
  See application file for complete search history.

(56) References Cited

U.S. PATENT DOCUMENTS

2021/0200295 A1* 7/2021 Ha ........................... G06F 21/84
2023/0359468 A1* 11/2023 Sivagnanenthirarajah ..................
                                                                                         G06F 9/54

FOREIGN PATENT DOCUMENTS

JP    2016-148895 A    8/2016

* cited by examiner

*Primary Examiner* — Dennis P Joseph
(74) *Attorney, Agent, or Firm* — Osha Bergman Watanabe & Burton LLP

(57) ABSTRACT

An information processing apparatus performs face detection processing to detect a face area and the orientation of a face from an image captured by an imaging unit, brightness reduction processing in which, when the orientation of the face detected by the face detection processing changes from a first orientation to a second orientation while the screen brightness of a display unit is controlled to a first screen brightness, the screen brightness is reduced from the first screen brightness to a second screen brightness after first time has elapsed, and imaging state determination processing to determine whether an imaging state is a first imaging state where the imaging unit can capture an image in an image brightness capable of detecting the face area or a second imaging state where the imaging unit cannot capture any image in the image brightness capable of detecting the face area.

8 Claims, 8 Drawing Sheets

INFORMATION PROCESSING APPARATUS AND CONTROL METHOD

CROSS-REFERENCE TO RELATED APPLICATIONS

This application claims priority to Japanese Patent Application No. 2023-047905 filed on Mar. 24, 2023, the contents of which are hereby incorporated herein by reference in their entirety.

BACKGROUND

Technical Field

The present invention relates to an information processing apparatus and a control method.

Description of Related Art

For example, Japanese Unexamined Patent Application Publication No. 2016-148895 discloses an apparatus which detects that a person has approached or has moved away using an infrared sensor to make a transition to a usable state when detecting that the person has approached or to a state with reduced power consumption when detecting that the person has moved away. Further, in recent years, with the development of computer vision and the like, detection accuracy when detecting a face from an image has been getting higher. Therefore, the detection of a person by detecting a face from a captured image is also performed instead of person detection by the infrared sensor. The detection of a person by face detection can not only detect the person more accurately but also detect the orientation of a face.

Further, in recent years, a function to save power by reducing the brightness of a display unit (display) has been attracting attention due to expectations for ESG (Environment, Social, Governance). For example, there is an information processing apparatus such as a personal computer to perform control to reduce the screen brightness of a display when the person has moved away or when a face is facing sideways even if the person is present.

However, in a pitch-dark environment, since no face can be detected from a captured image, a person and the orientation of a face cannot be detected by face detection. Therefore, there is an information processing apparatus that performs control to disable face detection processing not to falsely detect that no person is present even though a person is present in a dark environment. However, even in the dark environment, if a face is detectable depending on the brightness of the display, the face detection processing can also be enabled. In this case, when control to reduce the screen brightness based on the result of the face detection processing is performed, the face detection processing is disabled and the screen brightness is restored to the original brightness. However, when the display becomes brighter, since a face can be detected, there is a concern that processing is looped such as to enable the face detection processing again to perform control to reduce the screen brightness.

SUMMARY

The present invention has been made in view of the above circumstances, and it is an object thereof to provide an information processing apparatus and a control method capable of properly controlling the screen brightness using face detection.

The present invention has been made to solve the above problem, and an information processing apparatus according to the first aspect of the present invention includes: a memory which temporarily stores image data of an image captured by an imaging unit; and a processor which processes the image data stored in the memory, wherein the processor performs face detection processing to process the image data of the image stored in the memory in order to detect a face area with a face captured therein and an orientation of the face from the image, brightness reduction processing in which, when the orientation of the face detected by the face detection processing changes from a first orientation to a second orientation other than the first orientation while the screen brightness of a display unit is controlled to a first screen brightness, the screen brightness is reduced from the first screen brightness to a second screen brightness after first time has elapsed, and imaging state determination processing to determine whether an imaging state is a first imaging state where the imaging unit can capture an image in an image brightness capable of detecting the face area or a second imaging state where the imaging unit cannot capture any image in the image brightness capable of detecting the face area, and in the brightness reduction processing, when it is determined by the imaging state determination processing that the imaging unit becomes the second imaging state before the first time elapses, the processor stops the brightness reduction processing so that the screen brightness still continues the first screen brightness, or when it is determined by the imaging state determination processing that the imaging unit becomes the second imaging state after the first time has elapsed, the processor restores the screen brightness to the first screen brightness and stops the brightness reduction processing.

The above information processing apparatus may be such that, the processor disables the face detection processing and the brightness reduction processing on the condition that it is determined by the imaging state determination processing that the imaging unit becomes the second imaging state, and when disabling the face detection processing and the brightness reduction processing before the first time elapses, the processor enables the face detection processing and the brightness reduction processing on the condition that the it is determined by the imaging state determination processing that the imaging unit becomes the first imaging state, or when disabling the face detection processing and the brightness reduction processing after the first time has elapsed, the processor keeps the face detection processing and the brightness reduction processing disabled even though it is determined by the imaging state determination processing that the imaging unit becomes the first imaging state.

The above information processing apparatus may also be such that, when disabling the face detection processing and the brightness reduction processing after the first time has elapsed, the processor enables the brightness reduction processing after the display of the display unit is controlled to be turned off.

The above information processing apparatus may further be such that, when the orientation of the face detected by the face detection processing changes from the second orientation to the first orientation after the first time has elapsed and before it is determined by the imaging state determination processing that the imaging unit becomes the second imaging state, the processor stops the brightness reduction processing and restores the screen brightness to the first screen brightness.

Further, the above information processing apparatus may be such that, when input by a user is detected after the first time has elapsed and before it is determined by the imaging state determination processing that the imaging unit becomes the second imaging state, the processor stops the brightness reduction processing and restores the screen brightness to the first screen brightness.

Further, the above information processing apparatus may be such that, when the orientation of the face detected by the face detection processing changes from the second orientation to the first orientation before the first time elapses, the processor stops the brightness reduction processing so that the screen brightness still continues the first screen brightness.

Further, the above information processing apparatus may be such that, when input by a user is detected before the first time elapses, the processor stops the brightness reduction processing so that the screen brightness still continues the first screen brightness.

Further, a control method for an information processing apparatus according to the second aspect of the present invention is a control method for an information processing apparatus including: a memory which temporarily stores image data of an image captured by an imaging unit; and a processor which processes the image data stored in the memory, the control method causing the processor to execute: a face detection step of processing the image data of the image stored in the memory to detect a face area with a face captured therein and an orientation of the face from the image; a brightness reduction step in which, when the orientation of the face detected by the face detection step changes from a first orientation to a second orientation other than the first orientation while a screen brightness of a display unit is controlled to a first screen brightness, brightness reduction processing is performed to reduce the screen brightness from the first screen brightness to a second screen brightness after first time has elapsed; an imaging state determination step of determining whether an imaging state is a first imaging state where the imaging unit can capture an image in an image brightness capable of detecting the face area or a second imaging state where the imaging unit cannot capture any image in the image brightness capable of detecting the face area; a step of stopping execution of the brightness reduction processing so that the screen brightness still continues the first screen brightness when it is determined by the imaging state determination step that the imaging unit becomes the second imaging state before the first time elapses; or a step of restoring the screen brightness to the first screen brightness and stopping the brightness reduction processing when it is determined by the imaging state determination step that the imaging unit becomes the second imaging state after the first time has elapsed.

The above-described aspects of the present invention can control the screen brightness properly using face detection.

DETAILED DESCRIPTION

Embodiments of the present invention will be described below with reference to the accompanying drawings.

First Embodiment

First, a first embodiment of the present invention will be described.

Figure 1:
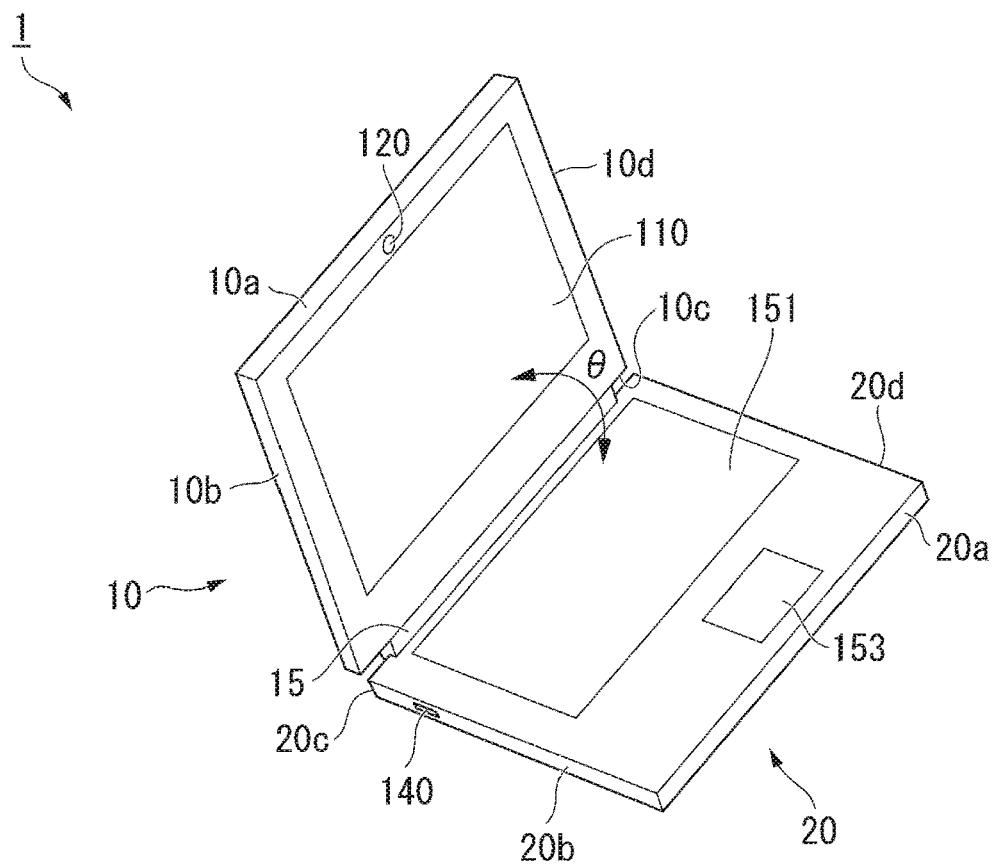
FIG. 1 is a perspective view illustrating a configuration example of the appearance of an information processing apparatus according to a first embodiment.

FIG. 1 is a perspective view illustrating a configuration example of the appearance of an information processing apparatus 1 according to the present embodiment.

The information processing apparatus 1 is, for example, a laptop (clamshell) PC (Personal Computer). The information processing apparatus 1 includes a first chassis 10, a second chassis 20, and a hinge mechanism 15. The first chassis 10 and the second chassis 20 are joined by using the hinge mechanism 15. The first chassis 10 is rotatable around the rotation axis of the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction to face a display screen of the display unit 110.

In the open state, the imaging unit 120 images a predetermined imaging range in the direction to face the display screen of the display unit 110 (i.e., in front of the information processing apparatus 1). The predetermined imaging range is a range of angles of view defined by an image sensor included in the imaging unit 120 and a lens provided in front of the imaging surface of the image sensor. For example, the imaging unit 120 can capture an image including a person (user) present in front of the information processing apparatus 1.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is a system operating state capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification.

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display screen of the display unit 110 may be constructed as a touch panel to accept operations. Further, a microphone used to input voice may be included in the input device.

Note that, in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, and put into a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
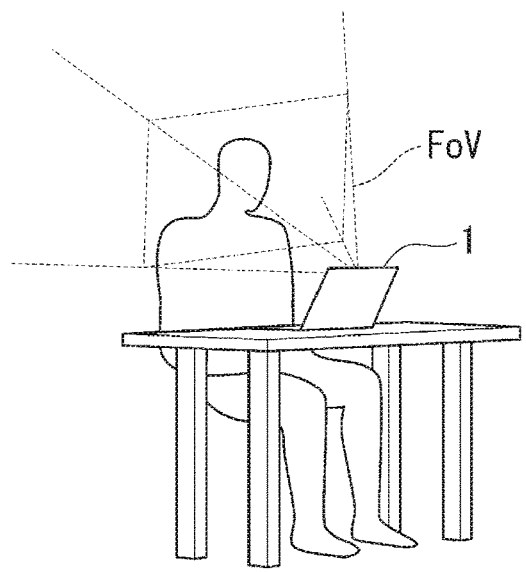
FIG. 2 is a diagram illustrating an example of a person detection range of the information processing apparatus according to the first embodiment.

FIG. 2 is a diagram illustrating an example of a person detection range of the information processing apparatus 1 according to the present embodiment. In the illustrated example, a detection range FoV (Field of View: detection viewing angle) in front of the information processing apparatus 1 is a person detectable range.

For example, the information processing apparatus 1 detects a face area with a face captured therein from the captured image captured by the imaging unit 120 to determine whether or not a person (user) is present in front of the information processing apparatus 1. The detection range FoV corresponds to an imaging angle of view of the information processing apparatus 1. When the face area is detected from the captured image, the information processing apparatus 1 determines that the person (user) is present. On the other hand, when no face area is detected from the captured image, the information processing apparatus 1 determines that no person (user) is present.

The information processing apparatus 1 controls the operating state of the system of the information processing apparatus 1 depending on the presence or absence of a person (user) by the HPD processing. For example, when a person (user) is present in front of the information processing apparatus 1, the information processing apparatus 1 controls the operating state to the normal operating state, while when no person (user) is present in front of the information processing apparatus 1, the information processing apparatus 1 controls the operating state to the standby state.

Figure 3A:
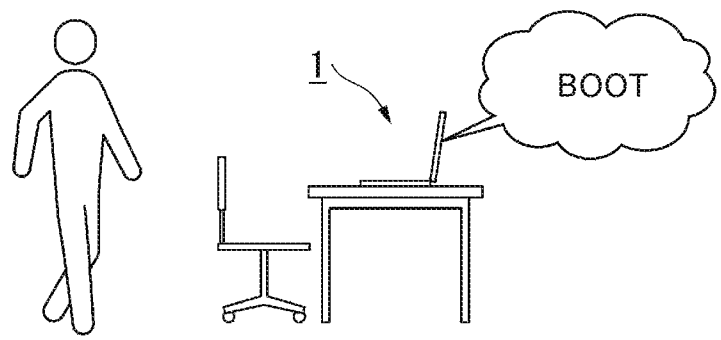
FIGS. 3A-3C are diagrams for describing an overview of HPD processing of the information processing apparatus according to the first embodiment.
Figure 3B:
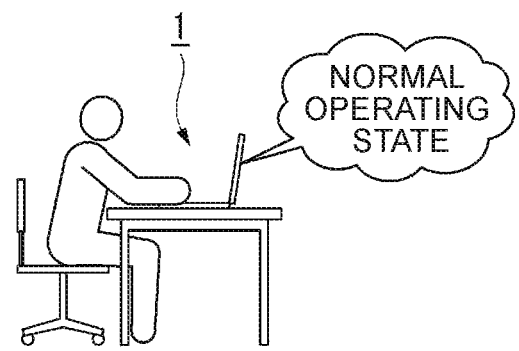
Figure 3C:
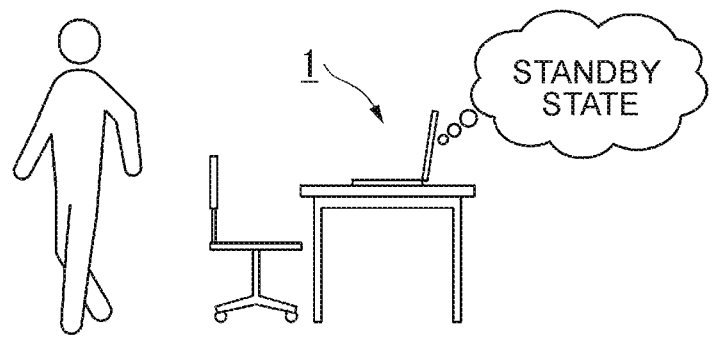

FIGS. 3A-3C are diagrams for describing an overview of HPD processing of the information processing apparatus 1 according to the present embodiment. The information processing apparatus 1 detects a person present in front of the information processing apparatus 1 by the HPD processing to control the operating state of the system of the information processing apparatus 1 based on the presence or absence of a person. For example, as illustrated in FIG. 3A, when detecting a change from a state where no person is present in front of the information processing apparatus 1 (Absence) to a state where a person is present (Presence) in the standby state, that is, when detecting that a person has approached the information processing apparatus 1 (Approach), the information processing apparatus 1 automatically boots the system to make a transition to the normal operating state. Further, in a state where a person is present in front of the information processing apparatus 1 (Presence) in the normal operating state as illustrated in FIG. 3B, the information processing apparatus 1 continues the normal operating state. Further, as illustrated in FIG. 3C, when detecting a change from the state where the person is present in front of the information processing apparatus 1 (Presence) to the state where no person is present (Absence), that is, when detecting that the person has left the information processing apparatus 1 (Leave), the information processing apparatus 1 causes the system to make a transition to the standby state.

Further, in the HPD processing, the information processing apparatus 1 detects the orientation of a face of the person present in front of the information processing apparatus 1.

Here, the orientation of a face is an orientation corresponding to a rotation angle of the face in the left and right direction and an orientation corresponding to a rotation angle of the face in the up and down direction. In the following, it is assumed that a state where the face is facing the direction of the information processing apparatus 1 (the direction of the display unit 110 and the imaging unit 120) is a state where the face is facing forward. For example, the information processing apparatus 1 determines whether or not the face of the person is facing forward.

Here, since the state where the face is facing forward is a state where the person is paying attention to the information processing apparatus 1, this state is called "Attention." On the other hand, the state where the face is not facing forward is called "No attention" because the person is not paying attention to the information processing apparatus 1.

For example, when the state changes from "Presence" to "Absence" (that is, when "Leave" is detected), the information processing apparatus 1 reduces the brightness of the display unit 110, and turns off the display to make the transition to the standby state after that. Further, even in "Presence," when the state changes from "Attention" to "No attention," the information processing apparatus 1 reduces the brightness of the display unit 110. Thus, when the user is absent or when the user is not looking at the display unit 110, the information processing apparatus 1 reduces the brightness of the display unit 110 to save power. The brightness of the display unit 110 means the brightness of a screen of the display unit 110, and it is called "screen brightness" below. Further, this processing to reduce the screen brightness in the HPD processing is called "screen brightness reduction processing."

Here, the original screen brightness before being reduced is, for example, a screen brightness in the state of "Presence" and "Attention," which is a screen brightness based on a brightness setting value initially set in the system, or a screen brightness based on a brightness setting value obtained by the user changing the initially-set brightness setting value. In the following, the screen brightness based on this initially-set brightness setting value or the brightness setting value obtained by the user changing the initially-set brightness setting value is called the "standard brightness." In contrast, a brightness reduced from the standard brightness is called the "low brightness." The brightness setting value of the low brightness is preset, which is set, for example, to a value of a screen brightness of about 0 to 10% of the standard brightness.

However, even when the person is present in front of the information processing apparatus 1, any face area may not be able to be detected from the captured image captured by the imaging unit 120. For example, there is an apparatus equipped with a camera shutter (camera cover) capable of physically shielding the imaging direction of the imaging unit 120 from the perspective of privacy protection or the like. In a state where this camera shutter is closed, the imaging direction of the imaging unit 120 is physically shielded by the camera shutter and any face area cannot be detected from the captured image. Therefore, the information processing apparatus 1 determines whether or not the camera shutter is in the closed state to control the HPD processing and the screen brightness reduction processing to enabled or disabled based on the determination result.

Note that, even when the imaging unit 120 is covered with a hand or the like, since the imaging direction is physically shielded, any face area cannot be detected from the captured image like in the state where the camera shutter is closed. Further, in a pitch-dark environment, since no face is captured in the captured image even though the imaging direction of the imaging unit 120 is not physically shielded, any face area cannot be detected from the captured image. In other words, the state where the camera shutter is closed, the state where the imaging unit 120 is covered with a hand or the like, and the pitch-dark environment are all imaging states in which it is impossible for the imaging unit 120 to capture an image in a brightness capable of detecting a face area, and hence any face area cannot be detected from the captured image.

Therefore, the information processing apparatus 1 determines that the state where the camera shutter is closed, the state where the imaging unit 120 is covered with a hand or the like, and the pitch-dark environment are all the state where the camera shutter is closed (Shutter closed). On the contrary, in an imaging state where the imaging unit 120 can capture an image in a brightness capable of detecting a face area, the information processing apparatus 1 determines that the imaging state is the state where the camera shutter is open (Shutter open).

For example, the information processing apparatus 1 determines whether the camera shutter is in the closed state (Shutter closed) or the camera shutter is in the open state (Shutter open) based on the brightness of the captured image captured by the imaging unit 120 (hereinafter called the "image brightness").

Specifically, for example, when the image brightness of the captured image is less than a predetermined brightness (threshold value), the information processing apparatus 1 determines that the camera shutter is in the closed state (Shutter closed). On the other hand, for example, when the image brightness of the captured image is a predetermined brightness (threshold value) or more, the information processing apparatus 1 determines that the camera shutter is in the open state (Shutter open). Note that the predetermined brightness (threshold value) used when determining that the camera shutter is in the closed state (Shutter closed) is set to a brightness (to have hysteresis) lower than the predetermined brightness (threshold value) used when determining that the camera shutter is in the open state (Shutter open).

Note that when an image area in which the image brightness of the captured image is less than the predetermined brightness (threshold value) is a predetermined percentage (for example, 90%) or more, the information processing apparatus 1 may determine that the camera shutter is in the closed state (Shutter closed).

Next, in screen brightness reduction processing by the HPD processing, control when it is determined that the camera shutter is in the closed state (Shutter closed) will be described with reference to FIG. 4.

Figure 4:
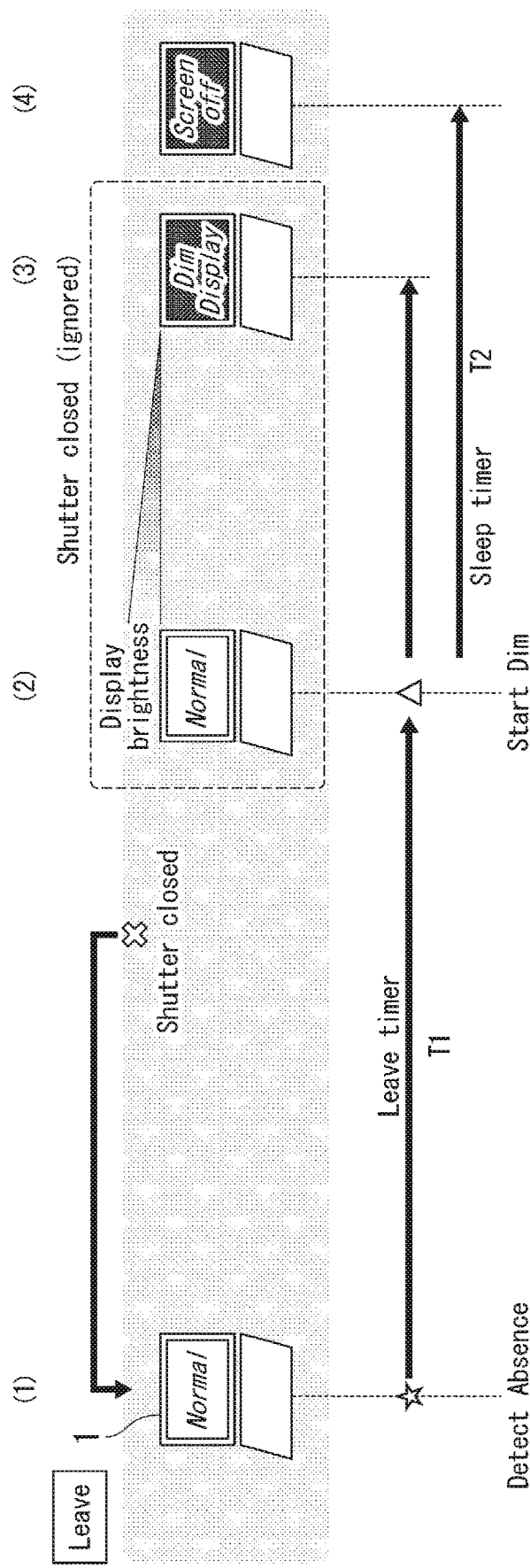
FIG. 4 is a diagram illustrating a control example of a screen brightness upon detecting "Leave" according to the first embodiment.

FIG. 4 is a diagram illustrating a control example of the screen brightness upon detecting "Leave" according to the present embodiment. FIG. 4 illustrates a control example when the closed state of the camera shutter (Shutter closed) is detected in the screen brightness reduction processing of the information processing apparatus 1 in the case where "Leave" is detected by the HPD processing.

At (1), the information processing apparatus 1 is in the normal operating state and the screen brightness is the standard brightness (Normal). Here, when detecting a state where the user is not present (Absence) in front (Detect absence), the information processing apparatus 1 starts measuring time T1 using a timer (Leave timer).

The time T1 is a period of time from when the state where the user is not present (Absence) in front is detected until "Leave" is determined, which is set to a predetermined period of time (for example, 30 seconds). Note that the time T1 may also be settable by the user.

At (2), when the time T1 has elapsed while remaining in the state where the user is not present (Absence) in front, the information processing apparatus 1 determines the state as "Leave." When determining "Leave," the information processing apparatus 1 starts screen brightness reduction processing to reduce the screen brightness from the standard brightness to the low brightness (Start Dim), and the screen brightness transitions to the low brightness (Dim Display) at (3). Further, when determining "Leave" at (2), the information processing apparatus 1 starts measuring time T2 using a timer (Sleep timer). Then, when the time T2 has elapsed while remaining in the state where the user is not present (Absence) in front, the information processing apparatus 1 turns off the display (Screen off).

The time T2 is a period of time from when "Leave" is determined until the display is turned off, which is set, for example, to a period of time (for example, one minute, five minutes, ten minutes, thirty minutes, or the like) longer than the time T1. Note that the time T2 may also be settable by the user.

Here, when determining that the camera shutter becomes the closed state (Shutter closed) before the time T1 elapses, the information processing apparatus 1 disables the HPD processing and the screen brightness reduction processing, and returns to the state of (1). In other words, the information processing apparatus 1 stops the screen brightness reduction processing so that the screen brightness still continues the standard brightness.

On the other hand, when determining that the camera shutter becomes the closed state (Shutter closed) after the time T1 has elapsed and the reduction of the screen brightness is started, the information processing apparatus 1 ignores the determination to keep the HPD processing and the screen brightness reduction processing enabled. In other words, the information processing apparatus 1 continues the brightness reduction processing so that the screen brightness still continues the low brightness.

Thus, the information processing apparatus 1 makes it different between before and after the elapse of the time T1 in terms of control when determining that the camera shutter becomes the closed state (Shutter closed). For example, upon detecting "Leave," when determining that the camera shutter becomes the closed state (Shutter closed) before the time T1 elapses (before reducing the screen brightness), the information processing apparatus 1 stops the screen brightness reduction processing so that the screen brightness still continues the standard brightness. On the other hand, when determining that the camera shutter becomes the closed state (Shutter closed) after the time T1 has elapsed (after the reduction of the screen brightness is started), the information processing apparatus 1 continues the screen brightness reduction processing so that the screen brightness still continues the low brightness.

Thus, for example, in the case where the information processing apparatus 1 is used in the pitch-dark environment, when the screen brightness is the standard brightness, the face detection processing is possible by the screen brightness, while when it is determined that the camera shutter becomes the closed state (Shutter closed) by reducing the screen brightness to the low brightness as a result of detecting "Leave," the screen brightness reduction processing can be continued so that the low brightness is still continued instead of restoring the screen brightness to the standard brightness.

Therefore, upon detecting "Leave" while the information processing apparatus 1 is used in the pitch-dark environment, loop processing in which the low brightness and the standard brightness are repeated as the screen brightness can be prevented.

Though not illustrated in FIG. 4, when there is input to an HID (Human Interface Device) (hereinafter called "HID input") regardless of before or after the elapse of the time T1, the information processing apparatus 1 stops measuring the time T1 or the time T2, and returns to the state of (1). The HID input is input to the HID by the user, which is operation input, for example, to the input device 150 (for example, the keyboard 151, the touch pad 153, or the like).

The configurations of the information processing apparatus 1 according to the present embodiment will be described in detail below.

[Hardware Configuration of Information Processing Apparatus]

Figure 5:
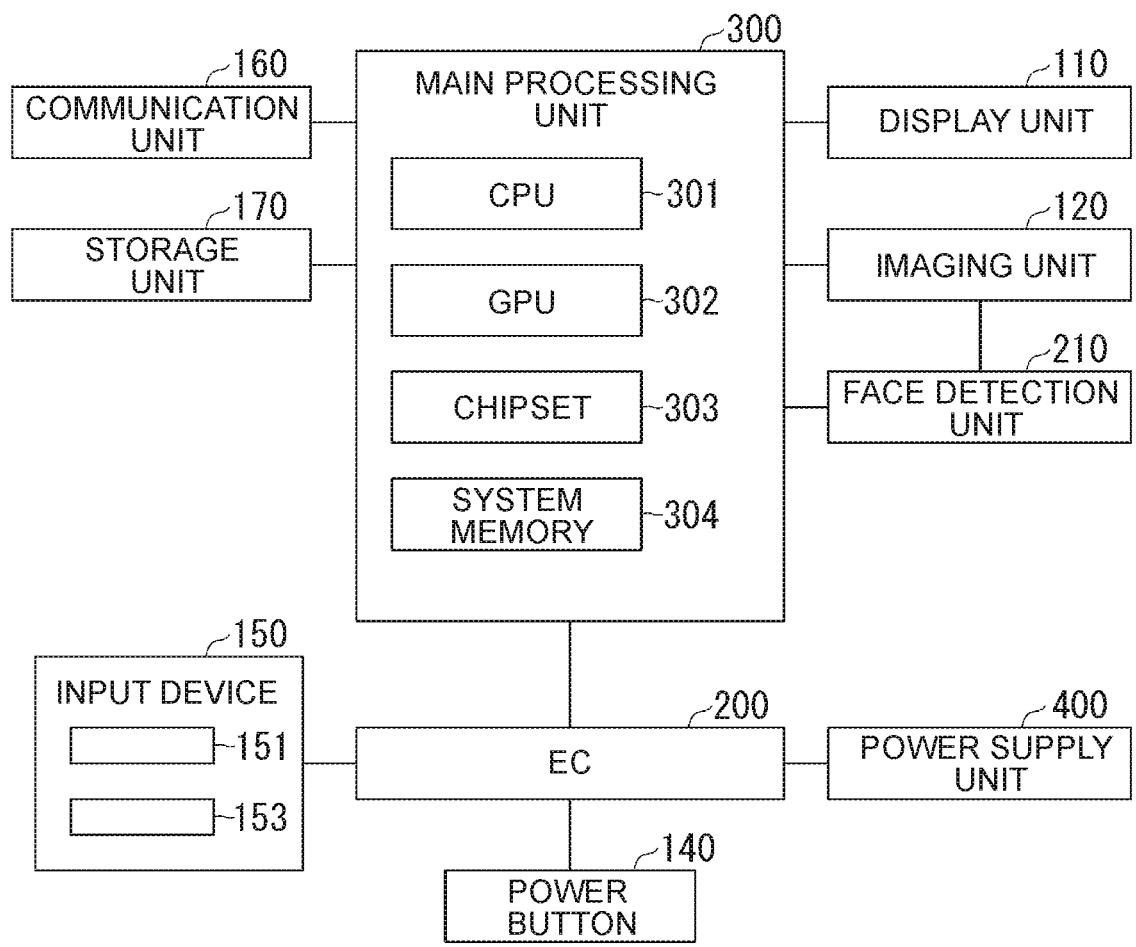
FIG. 5 is a schematic block diagram illustrating an example of the hardware configuration of the information processing apparatus according to the first embodiment.

FIG. 5 is a schematic block diagram illustrating an example of the hardware configuration of the information processing apparatus 1 according to the present embodiment. In FIG. 5, components corresponding to respective units in FIG. 1 are given the same reference numerals. The information processing apparatus 1 is configured to include the display unit 110, the imaging unit 120, the power button 140, the input device 150, a communication unit 160, a storage unit 170, an EC (Embedded Controller) 200, a face detection unit 210, a main processing unit 300, and a power supply unit 400.

The display unit 110 displays display data (images) generated based on system processing executed by the main processing unit 300, processing of application programs running on the system processing, and the like.

The imaging unit 120 captures an image of an object within the predetermined imaging range (angle of view) in the direction (frontward) to face the inner face of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both of the visible light camera and the infrared camera.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of operation details.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SSD (Solid State Drive), a RAM (Random Access Memory), a ROM (Read Only Memory), and a flash ROM. The storage unit 170 stores the OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor to execute HPD processing by face detection based on image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 and performs face detection processing to detect a face area from the captured image, detect the orientation of a face in a face image included in the detected face area, and the like. As the face detection method, any detection method using a face detection algorithm for detecting a face based on facial feature information, trained data (learned model) subjected to machine learning based on the facial feature information, a face detection library, or the like can be applied.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 is a processor to execute processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires the detection result by face detection processing acquired from the face detection unit 210, and the like, and outputs the acquired detection result and the like to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may also be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

[Functional Configuration of Information Processing Apparatus]

Next, the functional configuration of the information processing apparatus 1 to control the screen brightness of the display unit 110 by HPD processing will be described in detail.

Figure 6:
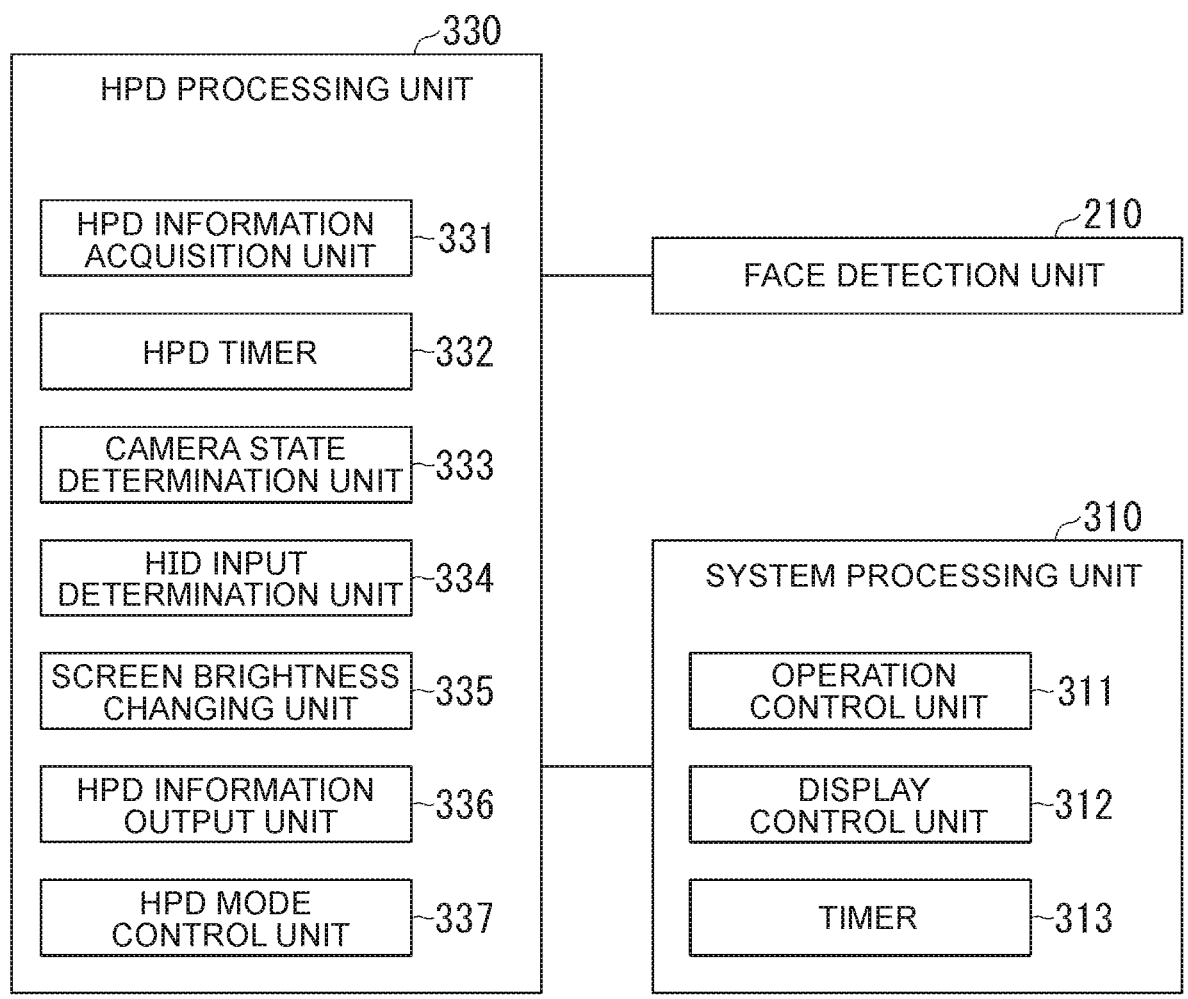
FIG. 6 is a schematic block diagram illustrating an example of the functional configuration of the information processing apparatus according to the first embodiment.

FIG. 6 is a schematic block diagram illustrating an example of the functional configuration of the information processing apparatus 1 according to the present embodiment. The information processing apparatus 1 includes the face detection unit 210, a system processing unit 310, and an HPD processing unit 330. The face detection unit 210 corresponds to the face detection unit 210 in FIG. 5, which executes HPD processing by face detection.

The face detection unit 210 processes image data of a captured image acquired from the imaging unit 120 to detect a face area with a face captured therein from the captured image. When the face area is detected from the captured image, the face detection unit 210 outputs "Presence" information indicating that a person is present in front of the information processing apparatus 1. On the other hand, when no face area is detected from the captured image, the face detection unit 210 outputs "Absence" information indicating that no person is present in front of the information processing apparatus 1.

Further, when the face area is detected from the captured image, the face detection unit 210 detects the orientation of a face of a face image included in the detected face area. For example, the face detection unit 210 detects an orientation corresponding to a rotation angle of the face in the left and right direction and an orientation corresponding to a rotation angle of the face in the up and down direction to determine whether or not the face is facing forward. When determining that the face is facing forward, the face detection unit 210 outputs "Attention" information indicative of a state where the person is paying attention to the information processing apparatus 1. On the other hand, when determining that the face is not facing forward, the face detection unit 210 outputs "No attention" information indicative of a state where the person is not paying attention to the information processing apparatus 1.

The HPD processing unit 330 includes an HPD information acquisition unit 331, an HPD timer 332, a camera state determination unit 333, an HID input determination unit 334, a screen brightness changing unit 335, an HPD information output unit 336, and an HPD mode control unit 337 as functional components implemented by the CPU 301 executing programs running on the OS or by the chipset 303 (for example, the sensor hub) executing programs.

The HPD information acquisition unit 331 acquires the "Presence" information, the "Absence" information, the "Attention" information, the "No attention" information, or the like output from the face detection unit 210.

The HPD timer 332 is a timer to measure time in the HPD processing. For example, the HPD timer 332 has a function as the timer (Leave timer) to measure the time T1 from when the HPD information acquisition unit 331 acquires the "Absence" information until "Leave" is determined (see FIG. 4).

The camera state determination unit 333 determines whether the imaging state is an imaging state where the imaging unit 120 can capture an image in a brightness capable of detecting a face area or an imaging state where the imaging unit 120 cannot capture any image in the brightness capable of detecting the face area.

For example, in the case of the imaging state where the imaging unit 120 can capture the image in the image brightness capable of detecting the face area, the camera state determination unit 333 determines that the camera shutter is in the open state (Shutter open) based on the image brightness of the captured image captured by the imaging unit 120. Specifically, for example, when the image brightness of the captured image is the predetermined brightness (threshold value) or more, the information processing apparatus 1 determines that the camera shutter is in the open state (Shutter open).

On the other hand, in the case of the imaging state where the imaging unit 120 cannot capture any image in the image brightness capable of detecting the face area, the camera state determination unit 333 determines that the camera shutter is in the closed state (Shutter closed) based on the image brightness of the captured image captured by the imaging unit 120. Specifically, for example, when the image brightness of the captured image is less than the predetermined brightness (threshold value), the information processing apparatus 1 determines that the camera shutter is in the closed state (Shutter closed).

The HID input determination unit 334 determines the presence or absence of operation input to the input device 150 (for example, the keyboard 151, the touch pad 153, or the like). For example, when the EC 200 acquires an operation signal output from the input device 150 (for example, the keyboard 151, the touch pad 153, or the like), the HID input determination unit 334 determines that there is HID input.

The screen brightness changing unit 335 changes the screen brightness of the display unit 110 by the HPD processing. When changing the screen brightness, the screen brightness changing unit 335 changes the brightness setting value stored in the storage unit 170. For example, when the HPD information acquisition unit 331 acquires the "Absence" information from the face detection unit 210 in the state where the screen brightness of the display unit 110 is controlled to the standard brightness, the screen brightness changing unit 335 executes the screen brightness reduction processing to reduce the screen brightness from the standard brightness to the low brightness after the time T1 has elapsed.

Further, when it is determined by the camera state determination unit 333 that the camera shutter becomes the closed state (Shutter closed) before the time T1 elapses, the screen brightness changing unit 335 disables the screen brightness reduction processing to stop the screen brightness reduction processing so that the screen brightness still continues the standard brightness.

On the other hand, when it is determined by the camera state determination unit 333 that the camera shutter becomes the closed state (Shutter closed) after the time T1 has elapsed, the screen brightness changing unit 335 ignores the determination to continue the screen brightness reduction processing so as to continue the screen brightness still in the state of being reduced to the low brightness.

Note that even when the "Presence" information is acquired from the face detection unit 210 (that is, even when a face area is detected from the captured image) before the time T1 elapses, the screen brightness changing unit 335 disables the screen brightness reduction processing to stop the screen brightness reduction processing so that the screen brightness still continues the standard brightness.

Similarly, even when it is determined by the HID input determination unit 334 that there is HID input (that is, even when input by the user is detected) before the time T1 elapses, the screen brightness changing unit 335 disables the screen brightness reduction processing to stop the screen brightness reduction processing so that the screen brightness still continues the standard brightness.

Further, when the "Presence" information is acquired from the face detection unit 210 (that is, when a face area is detected from the captured image) before the time T2 elapses after the elapse of the time T1, the screen brightness changing unit 335 stops the screen brightness reduction processing and restores the screen brightness to the standard brightness.

Similarly, when it is determined by the HID input determination unit 334 that there is HID input (that is, when input by the user is detected) before the time T2 elapses after the elapse of the time T1, the screen brightness changing unit 335 stops the screen brightness reduction processing and restores the screen brightness to the standard brightness.

The HPD information output unit 336 outputs, to the system processing unit 310, the "Presence" information, the "Absence" information, the "Attention" information, the "No attention" information, or the like acquired by the HPD information acquisition unit 331. Further, when the time T1 has elapsed after the HPD information acquisition unit 331 acquires the "Absence" information, the HPD information output unit 336 outputs "Leave" information to the system processing unit 310.

Before the time T1 elapses, the HPD mode control unit 337 disables the HPD processing (the face detection processing by the face detection unit 210) on the condition that it is determined by the camera state determination unit 333 that the camera shutter becomes the closed state (Shutter closed). On the other hand, after the time T1 has elapsed, even when it is determined by the camera state determination unit 333 that the camera shutter becomes the closed state (Shutter closed), the HPD mode control unit 337 keeps the HPD processing (the face detection processing by the face detection unit 210) enabled without being disabled.

The system processing unit 310 is a functional component implemented by the CPU 301 executing the BIOS and OS programs or programs running on the OS. For example, the system processing unit 310 includes an operation control unit 311, a display control unit 312, and a sleep timer 313 as functional components implemented by executing the OS program.

The operation control unit 311 controls the operating state of the system. For example, when the power button 140 is operated in the standby state, the operation control unit 311 boots the system from the standby state based on an operation signal acquired from the power button 140 through the EC 200. Further, the operation control unit 311 performs processing such as system shutdown, transition to the standby state, reboot, or the like based on an operation on a power menu (shutdown, sleep, reboot, or the like) of the OS displayed on the display unit 110 in the normal operating state.

Further, the operation control unit 311 controls the operating state of the system according to the HPD processing by the face detection unit 210. For example, when the "Leave" information is acquired from the HPD processing unit 330 in the normal operating state, the operation control unit 311 starts measuring the time T2 using the sleep timer 313, and makes the transition to the standby state after the time T2 has elapsed. Specifically, the operation control unit 311 gives an instruction to the display control unit 312 to make the transition to the standby state so as to turn off the display of the display unit 110. After that, the operation control unit 311 locks the system and makes the transition to the standby state. The lock of the system is to put the system into an unusable state until the user logs in, for example, by user authentication or the like.

Note that when the "Presence" information is acquired from the HPD processing unit 330 before the time T2 elapses, the operation control unit 311 ends the time measurement by the sleep timer 313, and continues the normal operating state without turning off the display of the display unit 110. Further, when it is determined that there is HID input in the HPD processing unit 330 (that is, when input by the user is detected) before the time T2 elapses, the operation control unit 311 ends the time measurement by the sleep timer 313, and continues the normal operating state without turning off the display of the display unit 110.

The display control unit 312 performs control to turn on and off the display of the display unit 110. Further, the display control unit 312 controls the screen brightness of the display unit 110 in the display-on state. Specifically, the display control unit 312 controls the screen brightness of the display unit 110 based on the brightness setting value stored in the storage unit 170. This brightness setting value is initially set in the system, but the brightness setting value can also be changed from the initial setting by the user depending on the usage environment and preference of the user. Further, this brightness setting value is changed by the HPD processing unit 330 (the screen brightness changing unit 335).

[Operation of Screen Brightness Reduction Processing]

Figure 7:
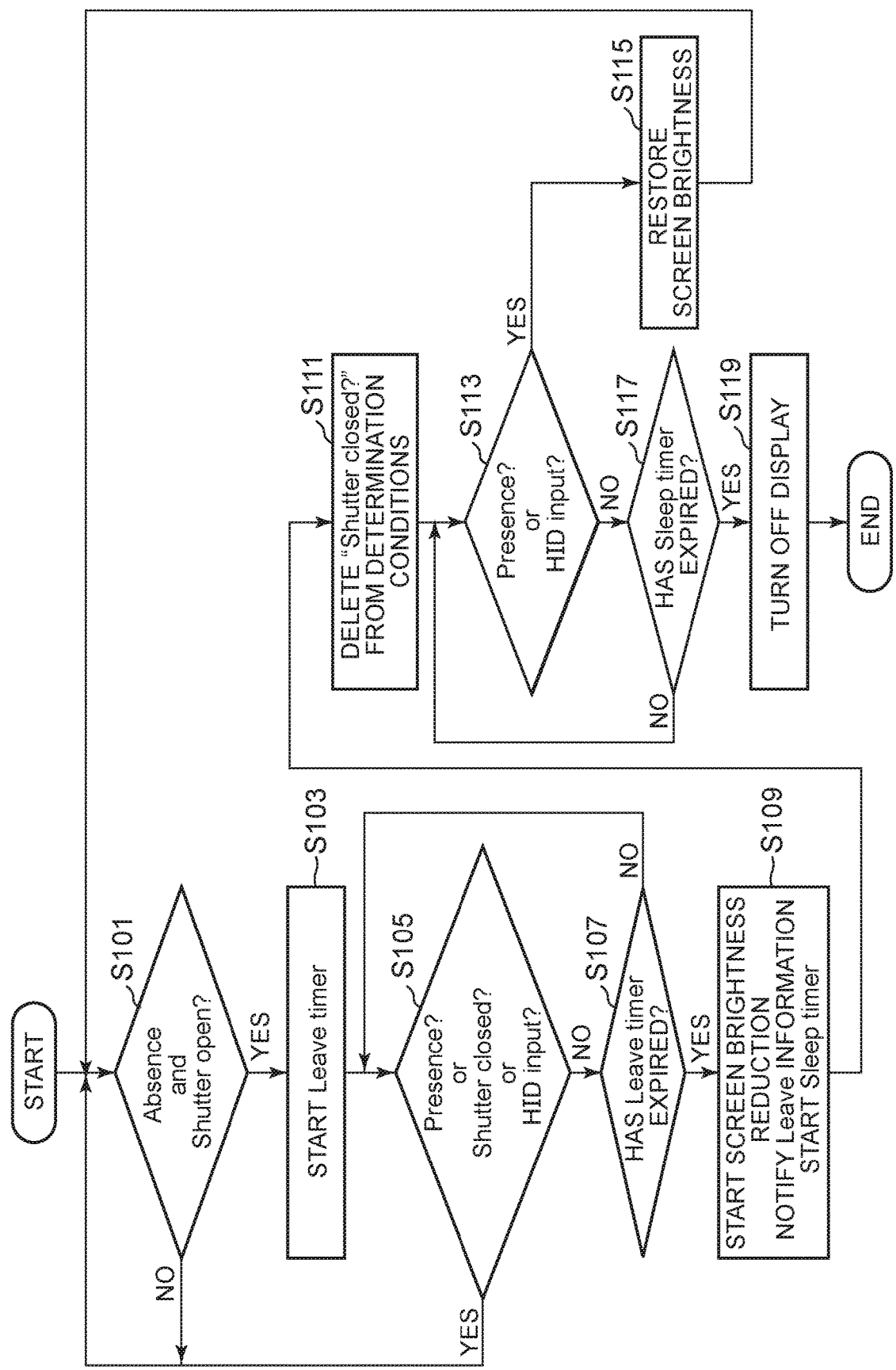
FIG. 7 is a flowchart illustrating an example of screen brightness reduction processing upon detecting "Leave" according to the first embodiment.

Referring next to FIG. 7, the operation of screen brightness reduction processing when "Leave" is detected by the HPD processing will be described. FIG. 7 is a flowchart illustrating an example of screen brightness reduction processing upon detecting "Leave" according to the present embodiment. Here, it is assumed that the information processing apparatus 1 is the state of "Presence" and "Attention" in the normal operating state, and the screen brightness of the display unit 110 is controlled to the standard brightness.

(Step S101) The HPD processing unit 330 determines whether or not the "Absence" information is acquired from the face detection unit 210. Further, the HPD processing unit 330 determines whether or not the camera shutter is in the open state (Shutter open). Then, when determining that the "Absence" information is acquired and the camera shutter is in the open state (Shutter open) (YES), the HPD processing unit 330 proceeds to a process in step S103, while when the determination is otherwise (NO), the HPD processing unit 330 performs the process in step S101 again.

(Step S103) The HPD processing unit 330 starts measuring the time T1 (starts the Leave timer) in response to acquiring the "Absence" information in step S101. Then, the HPD processing unit 330 proceeds to a process in step S105.

(Step S105) The HPD processing unit 330 determines whether or not the "Presence" information is acquired from the face detection unit 210. Further, the HPD processing unit 330 determines whether or not the camera shutter becomes the closed state (Shutter closed). Further, the HPD processing unit 330 determines whether or not there is HID input. Then, when determining that the "Presence" information is acquired (YES), when determining that the camera shutter becomes the closed state (Shutter closed) (YES), or when determining that there is HID input (YES), the HPD processing unit 330 returns to the process in step S101, while when the determination is otherwise (NO), the HPD processing unit 330 proceeds to a process in step S107.

(Step S107) The HPD processing unit 330 determines whether or not the measurement of the time T1 is ended (the Leave timer has expired). When determining that the measurement of the time T1 is not ended (the Leave timer does not expire) (NO), the HPD processing unit 330 returns to the process in step S105. On the other hand, when determining that the measurement of the time T1 is ended (the Leave timer has expired) (YES), the HPD processing unit 330 proceeds to a process in step S109.

(Step S109) The HPD processing unit 330 starts screen brightness reduction processing to reduce the screen brightness from the standard brightness to the low brightness. Further, the HPD processing unit 330 outputs the "Leave" information to the system processing unit 310 because the time T1 has elapsed. The system processing unit 310 starts measuring the time T2 (starts the Sleep timer) in response to acquiring the "Leave" information from the HPD processing unit 330. Then, the HPD processing unit 330 proceeds to a process in step S111.

(Step S111) The HPD processing unit 330 deletes, from the determination process in step S105, the determination of whether or not the camera shutter becomes the closed state (Shutter closed). Then, the HPD processing unit 330 proceeds to a process in step S113.

(Step S113) The HPD processing unit 330 determines whether or not the "Presence" information is acquired from the face detection unit 210. Further, the HPD processing unit 330 determines whether or not there is HID input. Then, when determining that the "Presence" information is acquired (YES), or when determining that there is HID input (YES), the HPD processing unit 330 proceeds to a process in step S115, while when the determination is otherwise (NO), the procedure proceeds to a process in step S117.

(Step S115) The HPD processing unit 330 restores the screen brightness to the standard brightness, and returns to the process in step S101. Note that, in the pitch-dark environment, since the HPD processing unit 330 never acquires the "Presence" information in step S113, only HID input is actually a condition for restoring the screen brightness to the standard brightness.

(Step S117) The system processing unit 310 determines whether or not the measurement of the time T2 is ended (the Sleep timer has expired). When determining that the measurement of the time T2 is not ended (NO), the procedure returns to the process in step S113. On the other hand, when determining that the measurement of the time T2 is ended (YES), the system processing unit 310 proceeds to a process in step S119 to perform control to turn off the display of the display unit 110.

Summary of First Embodiment

As described above, the information processing apparatus 1 according to the present embodiment includes: a memory (for example, the system memory 304) which temporarily stores image data of a captured image captured by the imaging unit 120; and a processor (for example, the face detection unit 210, the CPU 301, the chipset 303, or the like) which executes processing based on the image data stored in the memory. The information processing apparatus 1 processes the image data of the captured image, and executes face detection processing to detect a face area with a face captured therein from the captured image. Further, when the face area is no longer detected from the state where the face area is detected by the face detection processing while the screen brightness of the display unit 110 is controlled to the standard brightness (an example of a first screen brightness), the information processing apparatus 1 performs screen brightness reduction processing (an example of brightness reduction processing) to reduce the screen brightness from the standard brightness to the low brightness (an example of a second screen brightness) after the time T1 (an example of first time) has elapsed. Further, the information processing apparatus 1 performs imaging state determination processing to determine whether an imaging state is a state where a camera shutter is open (an example of a first imaging state) so that the imaging unit 120 can capture an image in an image brightness capable of detecting a face area or a state where the camera shutter is closed (an example of a second imaging state) so that the imaging unit 120 cannot capture any image in the image brightness capable of detecting the face area. Then, when it is determined by the imaging state determination processing that the camera shutter becomes the closed state (Shutter closed) before the time T1 elapses, the information processing apparatus 1 stops the screen brightness reduction processing so that the screen brightness still continues the standard brightness. On the other hand, when it is determined by the imaging state determination processing that the camera shutter becomes the closed state (Shutter closed) after the time T1 has elapsed, the information processing apparatus 1 continues the screen brightness reduction processing to continue the screen brightness still in a state of being reduced to the low brightness.

Thus, for example, in the case where the information processing apparatus 1 is used in a pitch-dark environment, when the screen brightness is the standard brightness, the face detection processing is possible by the screen brightness. However, even when it is determined that the camera shutter becomes the closed state (Shutter closed) by reducing the screen brightness to the low brightness as a result of detecting "Leave" (as a result of the fact that the face area is no longer detected from the state where the face area is detected), the information processing apparatus 1 can continue the screen brightness reduction processing still in the low brightness without restoring the screen brightness to the standard brightness.

Thus, when "Leave" is detected while the information processing apparatus 1 is used in the pitch-dark environment, the information processing apparatus 1 can prevent loop processing in which the low brightness and the standard brightness are repeated as the screen brightness. Therefore, the information processing apparatus 1 can control the screen brightness properly using face detection.

Further, before the time T1 elapses, the information processing apparatus 1 disables the face detection processing and the screen brightness reduction processing on the condition that it is determined by the imaging state determination processing that the camera shutter becomes the closed state (Shutter closed). On the other hand, after the time T1 has elapsed, even when it is determined by the imaging state determination processing that the camera shutter becomes the closed state (Shutter closed), the information processing apparatus 1 does not disable the face detection processing and the screen brightness reduction processing. In other words, the information processing apparatus 1 keeps the face detection processing and the screen brightness reduction processing enabled.

Thus, for example, in the case where the information processing apparatus 1 is used in the pitch-dark environment, even when it is determined that the camera shutter becomes the closed state (Shutter closed) by reducing the screen brightness to the low brightness as a result of detecting "Leave," since the information processing apparatus 1 keeps the face detection processing and the screen brightness reduction processing enabled still in the low brightness without restoring the screen brightness to the standard brightness, the information processing apparatus 1 can prevent loop processing in which the low brightness and the standard brightness are repeated as the screen brightness. Therefore, the information processing apparatus 1 can control the screen brightness properly using face detection.

Further, the information processing apparatus 1 further performs display control processing to perform control to turn off the display of the display unit 110 in response to the fact that the time T2 (an example of second time) has further elapsed after the elapse of the time T1.

Thus, for example, in the case where the information processing apparatus 1 is used in the pitch-dark environment, when it is determined that the camera shutter becomes the closed state (Shutter closed) by reducing the screen brightness to the low brightness as a result of detecting "Leave," the information processing apparatus 1 can perform further control to turn off the display after reducing the screen brightness in order to save more power.

Further, when the face area is detected by the face detection processing (when the state changes from "Absence" to "Presence") before the time T2 elapses after the elapse of the time T1, the information processing apparatus 1 stops the screen brightness reduction processing and restores the screen brightness to the standard brightness.

Thus, for example, in the case where the information processing apparatus 1 is used in the pitch-dark environment, when it is determined that the camera shutter becomes the closed state (Shutter closed) by reducing the screen brightness to the low brightness as a result of detecting "Leave," the information processing apparatus 1 can restore the screen brightness to the standard brightness to be put into the usable state when the pitch-dark environment changes to a bright environment and the state changes from "Absence"

to "Presence" before turning off the display even after reducing the screen brightness.

Further, when HID input (input by the user) is detected before the time T2 elapses after the elapse of the time T1, the information processing apparatus 1 stops the screen brightness reduction processing and restores the screen brightness to the standard brightness.

Thus, for example, in the case where the information processing apparatus 1 is used in the pitch-dark environment, when it is determined that the camera shutter becomes the closed state (Shutter closed) by reducing the screen brightness to the low brightness as a result of detecting "Leave," the information processing apparatus 1 can restore the screen brightness to the standard brightness to be put into the usable state when there is HID input before turning off the display even after reducing the screen brightness.

Further, when the face area is detected by the face detection processing (when the state changes from "Absence" to "Presence") before the time T1 elapses, the information processing apparatus 1 stops the screen brightness reduction processing so that the screen brightness still continues the standard brightness.

Thus, for example, in the case where the information processing apparatus 1 is used in the pitch-dark environment, when the user is back soon after disappearing temporarily from the front, the information processing apparatus 1 can continue the usable state without reducing the screen brightness.

Further, when HID input (input by the user) is detected before the time T1 elapses, the information processing apparatus 1 stops the screen brightness reduction processing so that the screen brightness still continues the standard brightness.

Thus, for example, in the case where the information processing apparatus 1 is used in the pitch-dark environment, when there is HID input immediately after the user disappears from the front, the information processing apparatus 1 can continue the usable state without reducing the screen brightness.

Further, a control method for the information processing apparatus 1 according to the present embodiment includes: a face detection step of processing image data of a captured image to detect a face area with a face captured therein from the captured image; a brightness reduction step in which, when the face area is no longer detected from a state where the face area is detected by the face detection step while the screen brightness of the display unit 110 is controlled to the standard brightness (the example of the first screen brightness), screen brightness reduction processing is performed to reduce the screen brightness from the standard brightness to the low brightness (the example of the second screen brightness) after the time T1 (the example of the first time) has elapsed; an imaging state determination step of determining whether the imaging state is the state where the camera shutter is in the open state (the example of the first imaging state) in which the imaging unit 120 can capture an image in an image brightness capable of detecting the face area or the state where the camera shutter is in the closed state (the example of the second imaging state) in which the imaging unit 120 cannot capture any image in the image brightness capable of detecting the face area; a step of stopping the screen brightness reduction processing so that the screen brightness still continues the standard brightness when it is determined by the imaging state determination step that the camera shutter becomes the closed state (Shutter closed) before the time T1 elapses; and a step of continuing the screen brightness reduction processing to continue the screen brightness still in the state of being reduced to the low brightness when it is determined by the imaging state determination step that the camera shutter becomes the closed state (Shutter closed) after the time T1 has elapsed.

Thus, for example, in the case where the information processing apparatus 1 is used in the pitch-dark environment, when the screen brightness is the standard brightness, the face detection processing is possible by the screen brightness according to the control method for the information processing apparatus 1. However, even when it is determined that the camera shutter becomes the closed state (Shutter closed) by reducing the screen brightness to the low brightness as a result of detecting "Leave," the screen brightness reduction processing can be continued still in the low brightness without restoring the screen brightness to the standard brightness.

Therefore, according to the control method for the information processing apparatus 1, when "Leave" is detected while the information processing apparatus 1 is used in the pitch-dark environment, loop processing in which the low brightness and the standard brightness are repeated as the screen brightness can be prevented. Thus, according to the control method for the information processing apparatus 1, control of the screen brightness using face detection can be performed properly.

Second Embodiment

Next, a second embodiment of the present invention will be described.

In the first embodiment, the screen brightness reduction processing when "Leave" is detected by the HPD processing is described, while in this embodiment, screen brightness reduction processing when "No Attention" is detected by the HPD processing will be described.

Figure 8:
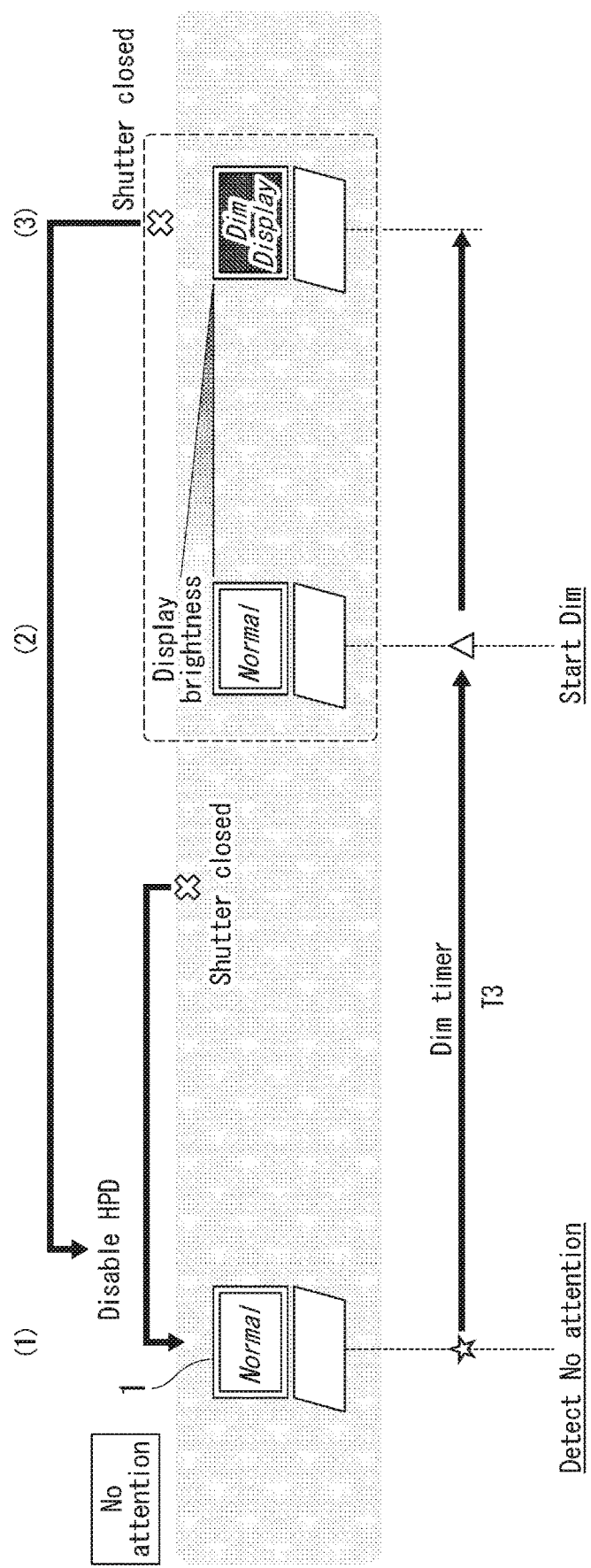
FIG. 8 is a diagram illustrating a control example of a screen brightness upon detecting "No Attention" according to a second embodiment.

FIG. 8 is a diagram illustrating a control example of the screen brightness upon detecting "No Attention" according to the present embodiment. FIG. 8 illustrates a control example in the case where it is detected that the camera shutter is in the closed state (Shutter closed) in the screen brightness reduction processing of the information processing apparatus 1 when "No Attention" is detected by the HPD processing. Note that the control example of the screen brightness upon detecting "No Attention" illustrated in FIG. 8 is different from the control example of the screen brightness upon detecting "Leave" illustrated in FIG. 4 in that the screen brightness is restored to the standard brightness and the screen brightness reduction processing is stopped when it is detected that the camera shutter is in the closed state (Shutter closed) after the screen brightness is reduced to the low brightness.

At (1), the information processing apparatus 1 is in the normal operating state and the screen brightness is the standard brightness (Normal). Here, when detecting a state where the face of the user present in front is not facing forward (No attention) (Detect No attention), the information processing apparatus 1 starts measuring time T3 using a timer (Dim timer).

The time T3 is a period of time from when the state where the face of the user is not facing forward is detected until the screen brightness reduction processing is started, which is set to a predetermined period of time (for example, 30 seconds). The time T3 may be set to the same period of time as the time T1, or may be set to a different period of time. Note that the time T3 may also be settable by the user.

At (2), when the time T3 has elapsed while remaining in the state where the face of the user is not facing forward (No attention), the information processing apparatus 1 starts the screen brightness reduction processing to reduce the screen brightness from the standard brightness to the low brightness (Start Dim), and the screen brightness transitions to the low brightness (Dim Display) at (3).

Here, when determining that the camera shutter becomes the closed state (Shutter closed) before the time T3 elapses, the information processing apparatus 1 disables the HPD processing and the screen brightness reduction processing, and returns to the state of (1). In other words, the information processing apparatus 1 stops the screen brightness reduction processing so that the screen brightness still continues the standard brightness. In this case, when determining that the camera shutter becomes the open state (Shutter open) after that, the information processing apparatus 1 enables the HPD processing and the screen brightness reduction processing.

On the other hand, when determining that the camera shutter becomes the closed state (Shutter closed) after the time T3 has elapsed and the reduction of the screen brightness is started, the information processing apparatus 1 restores the screen brightness to the standard brightness and disables the HPD processing and the screen brightness reduction processing to stop the screen brightness reduction processing. In this case, even when the camera shutter becomes the open state (Shutter open) after that, the information processing apparatus 1 keeps the HPD processing and the screen brightness reduction processing disabled, and enables the HPD processing after turning off the display (after the transition to the standby state). Then, when the transition of the system to the normal operating state is made (when the user logs in) upon next boot-up after the display is turned off (after the transition to the standby state), the information processing apparatus 1 enables the screen brightness reduction processing.

Thus, the information processing apparatus 1 makes it different between before and after the elapse of the time T3 in terms of control when determining that the camera shutter becomes the closed state (Shutter closed). For example, upon detecting "No attention," when determining that the camera shutter becomes the closed state (Shutter closed) before the time T3 elapses (before reducing the screen brightness), the information processing apparatus 1 stops the screen brightness reduction processing so that the screen brightness still continues the standard brightness. On the other hand, when determining that the camera shutter becomes the closed state (Shutter closed) after the time T3 has elapsed (after the reduction of the screen brightness is started), the information processing apparatus 1 restores the screen brightness to the standard brightness and disables the HPD processing and the screen brightness reduction processing to stop screen brightness reduction processing.

Thus, for example, in the case where the information processing apparatus 1 is used in the pitch-dark environment, when the screen brightness is the standard brightness, the face detection processing is possible by the screen brightness. However, when determining that the camera shutter becomes the closed state (Shutter closed) by reducing the screen brightness to the low brightness as a result of detecting "No attention," the information processing apparatus 1 can restore and fix the screen brightness to the standard brightness.

Thus, when "No attention" is detected while the information processing apparatus 1 is used in the pitch-dark environment, the information processing apparatus 1 can prevent loop processing in which the low brightness and the standard brightness are repeated as the screen brightness.

Though not illustrated in FIG. 8, the processing apparatus 1 returns to the state of (1) when there is HID input before the time T3 elapses, after the time T3 has elapsed, and before determining that the camera shutter becomes the closed state (Shutter closed).

The configurations of the information processing apparatus 1 according to the present embodiment will be described in detail below. Note that the basic configurations of the information processing apparatus 1 according to the present embodiment are the same as the configurations illustrated in FIG. 1, FIG. 5, and FIG. 6, and only functional components different from those of the first embodiment illustrated in FIG. 6 will be described here.

The HPD timer 332 has a function as a timer (Dim timer) to measure the time T3 from the time when the HPD information acquisition unit 331 acquires the "No attention" information until the screen brightness reduction processing is started (see FIG. 8).

When the HPD information acquisition unit 331 acquires the "No attention" information from the face detection unit 210 while the screen brightness of the display unit 110 is controlled to the standard brightness, the screen brightness changing unit 335 executes screen brightness reduction processing to reduce the screen brightness from the standard brightness to the low brightness after the time T3 has elapsed.

Further, when it is determined by the camera state determination unit 333 that the camera shutter becomes the closed state (Shutter closed) before the time T3 elapses, the screen brightness changing unit 335 disables the screen brightness reduction processing to stop the screen brightness reduction processing so that the screen brightness still continues the standard brightness.

Note that even when the "Attention" information is acquired from the face detection unit 210 (that is, even when the orientation of the face detected by the face detection unit 210 changes to a forward-looking orientation) before the time T3 elapses, the screen brightness changing unit 335 disables the screen brightness reduction processing to stop the screen brightness reduction processing so that the screen brightness still continues the standard brightness.

Similarly, even when it is determined by the HID input determination unit 334 that there is HID input (that is, even when input by the user is detected) before the time T3 elapses, the screen brightness changing unit 335 disables the screen brightness reduction processing to stop the screen brightness reduction processing so that the screen brightness still continues the standard brightness.

On the other hand, when it is determined by the camera state determination unit 333 that the camera shutter becomes the closed state (Shutter closed) after the time T3 has elapsed, the screen brightness changing unit 335 restores the screen brightness to the standard brightness and stops the screen brightness reduction processing.

Further, when the "Attention" information is acquired from the face detection unit 210 (that is, when the orientation of the face detected by the face detection unit 210 changes to the forward-looking orientation) after the time T3 has elapsed and before it is determined by the camera state determination unit 333 that the camera shutter becomes the closed state (Shutter closed), the screen brightness changing unit 335 stops the screen brightness reduction processing and restores the screen brightness to the standard brightness.

Further, when it is determined by the HID input determination unit 334 that there is HID input (that is, when input by the user is detected) after the time T3 has elapsed and before it is determined by the camera state determination unit 333 that the camera shutter becomes the closed state (Shutter closed) (that is, when input by the user is detected), the screen brightness changing unit 335 stops the screen brightness reduction processing and restores the screen brightness to the standard brightness.

The HPD mode control unit 337 disables the HPD processing (the face detection processing by the face detection unit 210) on the condition that it is determined by the camera state determination unit 333 that the camera shutter becomes the closed state (Shutter closed).

Then, when the HPD processing (the face detection processing by the face detection unit 210) is disabled before the time T3 elapses, the HPD mode control unit 337 enables the HPD processing (the face detection processing by the face detection unit 210) on the condition that it is determined by the camera state determination unit 333 that the camera shutter becomes the open state (Shutter open).

Further, when the HPD processing (the face detection processing by the face detection unit 210) is disabled after the time T3 has elapsed, the HPD mode control unit 337 keeps the HPD processing (the face detection processing by the face detection unit 210) disabled even though it is determined by the camera state determination unit 333 that the camera shutter becomes the open state (Shutter open). When the HPD processing (the face detection processing by the face detection unit 210) is disabled after the time T3 has elapsed, the HPD mode control unit 337 enables the screen brightness reduction processing after the display of the display unit 110 is controlled to be turned off.

[Operation of Screen Brightness Reduction Processing]

Figure 9:
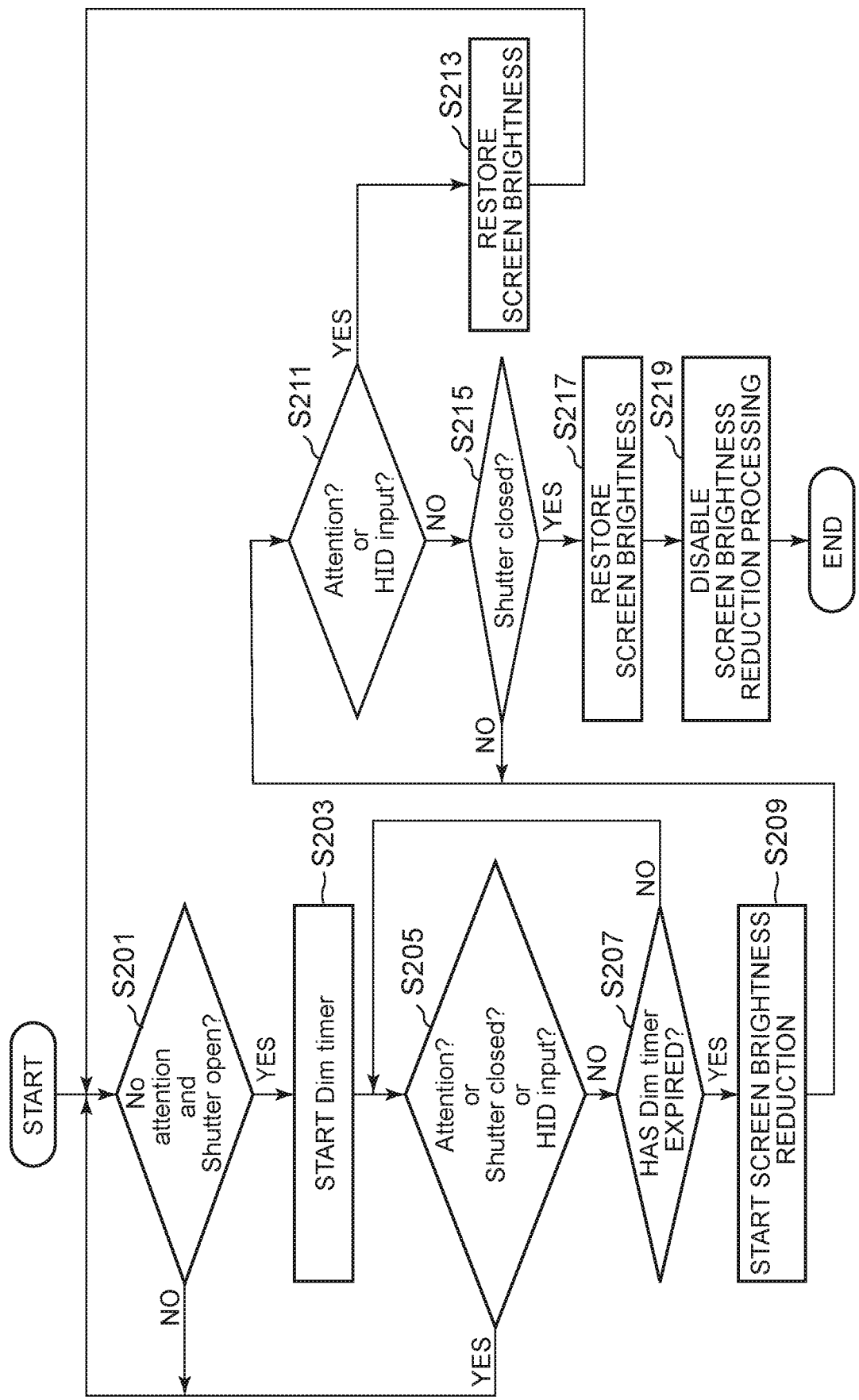
FIG. 9 is a flowchart illustrating an example of screen brightness reduction processing upon detecting "No attention" according to the second embodiment.

Referring next to FIG. 9, the operation of screen brightness reduction processing when "No attention" is detected by the HPD processing will be described. FIG. 9 is a flowchart illustrating an example of screen brightness reduction processing upon detecting "No attention" according to the present embodiment. Here, it is assumed that the information processing apparatus 1 is "Presence" and "Attention" in the normal operating state, and the screen brightness of the display unit 110 is controlled to the standard brightness.

(step S201) The HPD processing unit 330 determines whether or not the "No attention" information is acquired from the face detection unit 210. Further, the HPD processing unit 330 determines whether or not the camera shutter is in the open state (Shutter open). Then, when determining that the "No attention" information is acquired and the camera shutter is in the open state (Shutter open) (YES), the HPD processing unit 330 proceeds to a process in step S203, while when the determination is otherwise (NO), the HPD processing unit 330 performs the process in step S201 again.

(Step S203) The HPD processing unit 330 starts measuring the time T3 (starts the Dim timer) in response to acquiring the "No attention" information in step S201. Then, the HPD processing unit 330 proceeds to a process in step S205.

(Step S205) The HPD processing unit 330 determines whether or not the "Attention" information is acquired from the face detection unit 210. Further, the HPD processing unit 330 determines whether or not the camera shutter becomes the closed state (Shutter closed). Further, the HPD processing unit 330 determines whether or not there is HID input. Then, when determining that the "Attention" information is acquired (YES), when determining that the camera shutter becomes the closed state (Shutter closed) (YES), or when determining that there is HID input (YES), the HPD processing unit 330 returns to the process in step S201, while when the determination is otherwise (NO), the HPD processing unit 330 proceeds to a process in step S207.

(Step S207) The HPD processing unit 330 determines whether or not the measurement of the time T3 is ended (the Dim timer has expired). When determining that the measurement of the time T3 is not ended (NO), the HPD processing unit 330 returns to the process in step S205. On the other hand, when determining that the measurement of the time T3 is ended (YES), the HPD processing unit 330 proceeds to a process in step S209.

(Step S209) The HPD processing unit 330 starts the screen brightness reduction processing to reduce the screen brightness from the standard brightness to the low brightness. Then, the HPD processing unit 330 proceeds to a process in step S211.

(Step S211) The HPD processing unit 330 determines whether or not the "Attention" information is acquired from the face detection unit 210. Further, the HPD processing unit 330 determines whether or not there is HID input. Then, when determining that the "Attention" information is acquired (YES), or when determining that there is HID input (YES), the HPD processing unit 330 proceeds to a process in step S213, while when the determination is otherwise (NO), the HPD processing unit 330 proceeds to a process in step S215.

(Step S213) The HPD processing unit 330 restores the screen brightness to the standard brightness, and returns to the process in step S201. Note that, in the pitch-dark environment, since the HPD processing unit 330 never acquires the "Attention" information in step S211, only HID input is actually a condition for restoring the screen brightness to the standard brightness in step S213.

(Step S215) The HPD processing unit 330 determines whether or not the camera shutter becomes the closed state (Shutter closed). When determining that the camera shutter does not become the closed state (Shutter closed) (NO), the HPD processing unit 330 returns to the process in step S211. On the other hand, when determining that the camera shutter becomes the closed state (Shutter closed) (YES), the HPD processing unit 330 proceeds to a process in step S217.

(Step S217) The HPD processing unit 330 restores the screen brightness to the standard brightness and proceeds to a process in step S219.

(Step S219) The HPD processing unit 330 disables the screen brightness reduction processing. The HPD processing unit 330 also disables the HPD processing (the face detection processing by the face detection unit 210).

Note that, when restoring the screen brightness to the standard brightness and disabling the HPD processing and the screen brightness reduction processing in step S217 and step S219, the HPD processing unit 330 maintains that state until the display of the display unit 110 is controlled to be turned off. Then next time the information processing apparatus 1 is booted and the transition to the normal operating state is made (when logged in), the HPD processing unit 330 enables the HPD processing and the screen brightness reduction processing.

Summary of Second Embodiment

As described above, the information processing apparatus 1 according to the present embodiment includes: a memory (for example, the system memory 304) which temporarily stores image data of a captured image captured by the imaging unit 120; and a processor (for example, the face detection unit 210, the CPU 301, the chipset 303, or the like) which executes processing based on the image data stored in the memory. The information processing apparatus 1 executes face detection processing to process the image data of the captured image in order to detect a face area with a face captured therein and the orientation of the face from the captured image. Further, when the orientation of the face detected by the face detection processing changes from the front (first orientation) to an orientation other than the front (second orientation) while the screen brightness of the display unit 110 is controlled to the standard brightness (the example of the first screen brightness), the information processing apparatus 1 performs the screen brightness reduction processing (the example of the brightness reduction processing) to reduce the screen brightness from the standard brightness to the low brightness (the example of the second screen brightness) after the time T3 (the example of the first time) has elapsed. Further, the information processing apparatus 1 performs imaging state determination processing to determine whether the imaging state is a state where the camera shutter is open so that the imaging unit 120 can capture an image in an image brightness capable of detecting the face area (the example of the first imaging state) or a state where the camera shutter is closed so that the imaging unit 120 cannot capture any image in the image brightness capable of detecting the face area (the example of the second imaging state). Then, when it is determined by the imaging state determination processing that the camera shutter becomes the closed state (Shutter closed) before the time T3 elapses, the information processing apparatus 1 stops the screen brightness reduction processing so that the screen brightness still continues the standard brightness. On the other hand, when it is determined by the imaging state determination processing that the camera shutter becomes the closed state (Shutter closed) after the time T3 has elapsed, the information processing apparatus 1 restores the screen brightness to the standard brightness and stops the screen brightness reduction processing.

Thus, for example, in the case where the information processing apparatus 1 is used in the pitch-dark environment, when the screen brightness is the standard brightness, the face detection processing is possible by the screen brightness. However, even when it is determined that the camera shutter becomes the closed state (Shutter closed) by reducing the screen brightness to the low brightness as a result of detecting "No attention" (as a result of the fact that the orientation of the face changes from the front to an orientation other than the front), the information processing apparatus 1 can fix the screen brightness to the standard brightness.

Thus, when "No attention" is detected while the information processing apparatus 1 is used in the pitch-dark environment, the information processing apparatus 1 can prevent loop processing in which the low brightness and the standard brightness are repeated as the screen brightness. Therefore, the information processing apparatus 1 can control the screen brightness properly using face detection.

Further, the information processing apparatus 1 disables the face detection processing and the screen brightness reduction processing on the condition that it is determined by the imaging state determination processing that the camera shutter becomes the closed state (Shutter closed). Then, when disabling the face detection processing and the screen brightness reduction processing before the time T3 elapses, the information processing apparatus 1 enables the face detection processing and the screen brightness reduction processing on the condition that it is determined by the imaging state determination processing that the camera shutter becomes the open state (Shutter open). On the other hand, when disabling the face detection processing and the screen brightness reduction processing after the time T3 has elapsed, the information processing apparatus 1 keeps the face detection processing and the screen brightness reduction processing disabled even though it is determined by the imaging state determination processing that the camera shutter becomes the open state (Shutter open).

Thus, for example, in the case where the information processing apparatus 1 is used in the pitch-dark environment, even when it is determined that the camera shutter becomes the closed state (Shutter closed) by reducing the screen brightness to the low brightness as a result of detecting "No attention," since the information processing apparatus 1 fixes the screen brightness to the standard brightness and disables the face detection processing and the screen brightness reduction processing, the information processing apparatus 1 can prevent loop processing in which the low brightness and the standard brightness are repeated as the screen brightness. Therefore, the information processing apparatus 1 can control the screen brightness properly using face detection.

Further, when disabling the face detection processing and the screen brightness reduction processing after the time T3 has elapsed, the information processing apparatus 1 enables the face detection processing and the screen brightness reduction processing after the display of the display unit 110 is controlled to be turned off.

Thus, when the user newly uses the information processing apparatus 1 after the display is turned off, the information processing apparatus 1 can enable the face detection processing and the screen brightness reduction processing.

Further, when the orientation of the face detected by the face detection processing changes from the orientation other than the front to the front (when the state changes from "No attention" to "Attention") after the time T3 has elapsed and before it is determined by the imaging state determination processing that the camera shutter becomes the closed state (Shutter closed), the information processing apparatus 1 stops the screen brightness reduction processing and restores the screen brightness to the standard brightness.

Thus, for example, in the case where the information processing apparatus 1 is used in the pitch-dark environment, when it is determined that the camera shutter becomes the closed state (Shutter closed) by reducing the screen brightness to the low brightness as a result of detecting "No attention," the information processing apparatus 1 restores the screen brightness to the standard brightness to be put into the usable state when the pitch-dark environment changes to a bright environment and the state changes from "No attention" to "Attention" even after the screen brightness is reduced.

Further, when HID input (input by the user) is detected after the time T3 has elapsed and before it is determined by the imaging state determination processing that the camera shutter becomes the closed state (Shutter closed), the information processing apparatus 1 stops the screen brightness reduction processing and restores the screen brightness to the standard brightness.

Thus, for example, in the case where the information processing apparatus 1 is used in the pitch-dark environment, when it is determined that the camera shutter becomes the closed state (Shutter closed) by reducing the screen brightness to the low brightness as a result of detecting "No attention," the information processing apparatus 1 can restore the screen brightness to the standard brightness to be put into the usable state when there is HID input even after reducing the screen brightness.

Further, when the orientation of the face detected by the face detection processing changes from an orientation other than the front to the front (when the state changes from "No attention" to "Attention") before the time T3 elapses, the information processing apparatus 1 stops the screen brightness reduction processing so that the screen brightness still continues the standard brightness.

Thus, for example, in the case where the information processing apparatus 1 is used in the pitch-dark environment, when the face of the user turned to the front immediately after facing away from the front, the information processing apparatus 1 can continue the usable state without reducing the screen brightness.

Further, when HID input (input by the user) is detected before the time T3 elapses, the information processing apparatus 1 stops the screen brightness reduction processing so that the screen brightness still continues the standard brightness.

Thus, for example, in the case where the information processing apparatus 1 is used in the pitch-dark environment, when there is HID input immediately after the face of the user is facing away from the front, the information processing apparatus 1 can continue the usable state without reducing the screen brightness.

Further, a control method for the information processing apparatus 1 according to the present embodiment includes: a face detection step of processing image data of a captured image to detect a face area with a face captured therein and an orientation of the face from the captured image; a brightness reduction step in which, when the orientation of the face detected by the face detection step changes from the front (first orientation) to an orientation other than the front (second orientation) while the screen brightness of the display unit 110 is controlled to the standard brightness (the example of the first screen brightness), screen brightness reduction processing is performed to reduce the screen brightness from the standard brightness to the low brightness (the example of the second screen brightness) after the time T3 (the example of the first time) has elapsed; an imaging state determination step of determining whether an imaging state is the open state of the camera shutter (the example of the first imaging state) where the imaging unit 120 can capture an image in an image brightness capable of detecting the face area or the closed state of the camera shutter (the example of the second imaging state) where the imaging unit 120 cannot capture any image in the image brightness capable of detecting the face area; a step of stopping the brightness reduction processing so that the screen brightness still continues the standard brightness when it is determined by the imaging state determination step that the camera shutter becomes the closed state (Shutter closed) before the time T3 elapses; or a step of restoring the screen brightness to the standard brightness and stopping the brightness reduction processing when it is determined by the imaging state determination step that the camera shutter becomes the closed state (Shutter closed) after the time T3 has elapsed.

Thus, for example, in the case where the information processing apparatus 1 is used in the pitch-dark environment, when the screen brightness is the standard brightness, the face detection processing is possible by the screen brightness according to the control method for the information processing apparatus 1. However, when it is determined that the camera shutter becomes the closed state (Shutter closed) by reducing the screen brightness to the low brightness as a result of detecting "No attention" (as a result of the fact that the face orientation changes from the front to an orientation other than the front), the screen brightness can be fixed to the standard brightness.

Therefore, according to the control method for the information processing apparatus 1, when "No attention" is detected while the information processing apparatus 1 is used in the pitch-dark environment, loop processing in which the low brightness and the standard brightness are repeated as the screen brightness can be prevented. Thus, according to the control method for the information processing apparatus 1, the control of the screen brightness using face detection can be performed properly.

While the embodiments of this invention have been described in detail above with reference to the accompanying drawings, the specific configurations are not limited to those in the embodiments described above, and design changes are also included without departing from the scope of this invention. For example, the respective components described in the above-described embodiments can be combined arbitrarily.

Further, in the second embodiment mentioned above, the configuration in which the face area and the face orientation are detected from a captured image captured by the imaging unit 120 is described. However, when the screen brightness reduction processing upon detecting "Leave" in the first embodiment is performed but the screen brightness reduction processing upon detecting "No attention" in the second embodiment is not performed, the configuration may also be such that the detection of the face orientation is not performed. For example, the configuration may be such that the face area is detected from the captured image to detect the presence or absence of a person (user) present in front of the information processing apparatus 1 in order to perform the control of the screen brightness and the control of the operating state of the system.

Further, the configuration example in which the imaging unit 120 is built in the information processing apparatus 1 is described, but the present invention is not limited to this example. For example, the imaging unit 120 does not have to be built in the information processing apparatus 1, which may also be attachable to the information processing apparatus 1 (for example, onto any one of the side faces 10a, 10b, 10c, and the like) and communicably connected to the information processing apparatus 1 wirelessly or by wire as an external accessory of the information processing apparatus 1.

Further, in the aforementioned embodiments, the example in which the face detection unit 210 is provided separately from the CPU 301 and the chipset 303, but some or all of the functions of the face detection unit 210 may be provided in the chipset 303, or may be provided in a processor integrated with the CPU 301 or the chipset 303. For example, the CPU 301, the chipset 303, and the face detection unit 210 may be configured as individual processors, or configured to be integrated as one processor. Further, some or all of the functions of the face detection unit 210 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the embodiments mentioned above is not limited to the laptop PC, which may be, for example, a desktop PC or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 information processing apparatus
10 first chassis
20 second chassis
15 hinge mechanism
110 display unit
120 imaging unit
140 power button
150 input device
151 keyboard
153 touch pad
160 communication unit
170 storage unit
200 EC
210 face detection unit
300 main processing unit
301 CPU
302 GPU
303 chipset
304 system memory
310 system processing unit
311 operation control unit
312 display control unit
313 sleep timer
330 HPD processing unit
331 HPD information acquisition unit
332 HPD timer
333 camera state determination unit
334 HID input determination unit
335 screen brightness changing unit
336 HPD information output unit
337 HPD mode control unit
400 power supply unit

What is claimed is:

1. An information processing apparatus comprising:
a memory which temporarily stores image data of an image captured by an imaging unit; and
a processor which processes the image data stored in the memory, wherein the processor performs
face detection processing to process the image data of the image stored in the memory in order to detect a face area with a face captured therein and an orientation of the face from the image,
brightness reduction processing in which, when the orientation of the face detected by the face detection processing changes from a first orientation to a second orientation other than the first orientation while a screen brightness of a display unit is controlled to a first screen brightness, the screen brightness is reduced from the first screen brightness to a second screen brightness after first time has elapsed, and
imaging state determination processing to determine whether an imaging state is a first imaging state where the imaging unit can capture an image in an image brightness capable of detecting the face area or a second imaging state where the imaging unit cannot capture any image in the image brightness capable of detecting the face area, and
in the brightness reduction processing,
when it is determined by the imaging state determination processing that the imaging unit becomes the second imaging state before the first time elapses, the processor stops the brightness reduction processing so that the screen brightness still continues the first screen brightness, or
when it is determined by the imaging state determination processing that the imaging unit becomes the second imaging state after the first time has elapsed, the processor restores the screen brightness to the first screen brightness and stops the brightness reduction processing
wherein
the processor disables the face detection processing and the brightness reduction processing on a condition that it is determined by the imaging state determination processing that the imaging unit becomes the second imaging state, and
when disabling the face detection processing and the brightness reduction processing before the first time elapses, the processor enables the face detection processing and the brightness reduction processing on the condition that it is determined by the imaging state determination processing that the imaging unit becomes the first imaging state.

2. The information processing apparatus according to claim 1, wherein
when disabling the face detection processing and the brightness reduction processing after the first time has elapsed, the processor keeps the face detection processing and the brightness reduction processing disabled even though it is determined by the imaging state determination processing that the imaging unit becomes the first imaging state.

3. The information processing apparatus according to claim 2, wherein when disabling the face detection processing and the brightness reduction processing after the first time has elapsed, the processor enables the brightness reduction processing after the display of the display unit is controlled to be turned off.

4. The information processing apparatus according to claim 1, wherein when the orientation of the face detected by the face detection processing changes from the second orientation to the first orientation after the first time has elapsed and before it is determined by the imaging state determination processing that the imaging unit becomes the second imaging state, the processor stops the brightness reduction processing and restores the screen brightness to the first screen brightness.

5. The information processing apparatus according to claim 1, wherein when input by a user is detected after the first time has elapsed and before it is determined by the imaging state determination processing that the imaging unit becomes the second imaging state, the processor stops the brightness reduction processing and restores the screen brightness to the first screen brightness.

6. The information processing apparatus according to claim 1, wherein when the orientation of the face detected by the face detection processing changes from the second orientation to the first orientation before the first time elapses, the processor stops the brightness reduction processing so that the screen brightness still continues the first screen brightness.

7. The information processing apparatus according to claim 1, wherein when input by a user is detected before the first time elapses, the processor stops the brightness reduction processing so that the screen brightness still continues the first screen brightness.

8. A control method for an information processing apparatus including: a memory which temporarily stores image data of an image captured by an imaging unit; and a processor which processes the image data stored in the memory, the control method causing the processor to execute:
a face detection step of processing the image data of the image stored in the memory to detect a face area with a face captured therein and an orientation of the face from the image;
a brightness reduction step in which, when the orientation of the face detected by the face detection step changes from a first orientation to a second orientation other than the first orientation while a screen brightness of a display unit is controlled to a first screen brightness, brightness reduction processing is performed to reduce the screen brightness from the first screen brightness to a second screen brightness after first time has elapsed;
an imaging state determination step of determining whether an imaging state is a first imaging state where the imaging unit can capture an image in an image brightness capable of detecting the face area or a second imaging state where the imaging unit cannot capture any image in the image brightness capable of detecting the face area;
a step of stopping execution of the brightness reduction processing so that the screen brightness still continues the first screen brightness when it is determined by the imaging state determination step that the imaging unit becomes the second imaging state before the first time elapses; or
a step of restoring the screen brightness to the first screen brightness and stopping the brightness reduction processing when it is determined by the imaging state determination step that the imaging unit becomes the second imaging state after the first time has elapsed
a step of stopping execution of the face detection processing and the brightness reduction processing on a condition that it is determined by the imaging state determination step that the imaging unit becomes the second imaging state, and
when stopping execution of the face detection processing and the brightness reduction processing before the first time elapses, the processor enables the face detection processing and the brightness reduction processing on the condition that it is determined by the imaging state determination processing that the imaging unit becomes the first imaging state.

* * * * *